United States Patent

Ohtsuka et al.

[11] Patent Number: 5,546,283
[45] Date of Patent: Aug. 13, 1996

[54] VEHICULAR HEADLAMP HAVING IMPROVED ASSEMBLY EFFICIENCY

[75] Inventors: Yasushi Ohtsuka; Katutada Shirai; Ken Matsuoka; Yoshio Suehiro; Hideki Ohashi, all of Shizuoka, Japan

[73] Assignee: Koito Manufacturing Co., Ltd., Tokyo, Japan

[21] Appl. No.: 360,955

[22] Filed: Dec. 21, 1994

[30] Foreign Application Priority Data

Dec. 21, 1993 [JP] Japan .................................. 5-344708

[51] Int. Cl.$^6$ ...................................................... B60Q 1/06
[52] U.S. Cl. ............................. 362/61; 362/289; 362/428; 362/66
[58] Field of Search .................... 362/66, 61, 80, 362/287, 428, 273, 288, 284, 427; 33/365, 376, 288

[56] References Cited

U.S. PATENT DOCUMENTS

| | | | |
|---|---|---|---|
| 4,503,486 | 3/1985 | Makita | 362/61 |
| 4,689,725 | 8/1987 | Saijo et al. | 362/66 |
| 4,845,598 | 7/1989 | Watanabe et al. | 362/61 |
| 4,870,544 | 9/1989 | Iwamoto | 362/66 |
| 4,881,152 | 11/1989 | Watanabe et al. | 362/61 |
| 5,065,293 | 11/1991 | Mochizuki | 362/273 |
| 5,077,642 | 12/1991 | Lisak | 362/66 |
| 5,197,794 | 3/1993 | Scott et al. | 362/66 |
| 5,343,372 | 8/1994 | Shirai et al. | 362/66 |

*Primary Examiner*—Denise L. Gromada
*Assistant Examiner*—Thomas M. Sember
*Attorney, Agent, or Firm*—Sughrue, Mion, Zinn, Macpeak & Seas

[57] ABSTRACT

In vehicular headlamp an adjusting shaft is provided in a lamp housing for adjusting the irradiating angle of the headlamp. The adjusting shaft is threadedly joined to a nut formed with a threaded hole and a notch which opens the threaded hole into a side surface. The threaded shaft portion of the adjusting shaft is engaged with the threaded hole through the notch.

14 Claims, 7 Drawing Sheets

VEHICULAR HEADLAMP HAVING IMPROVED ASSEMBLY EFFICIENCY

BACKGROUND OF THE INVENTION

The present invention relates to a vehicular headlamp. More particularly, the present invention relates to a vehicular headlamp which offers greater ease in assembly and especially in the assembly of an adjusting shaft.

Conventionally, there has been known a vehicular headlamp which includes a stationary member, which is fixed to the vehicle body, a tiltable member, which is tilted, for example, in relation to the lamp housing and thereby varies the light illumination angle, and an adjusting shaft, which tiltably supports a reflector, for example, is supported with the support on the fixed member in such a manner that the adjusting shaft may rotate freely, and is threadedly joined to a nut supported, for example, on the reflector.

Figure 8:
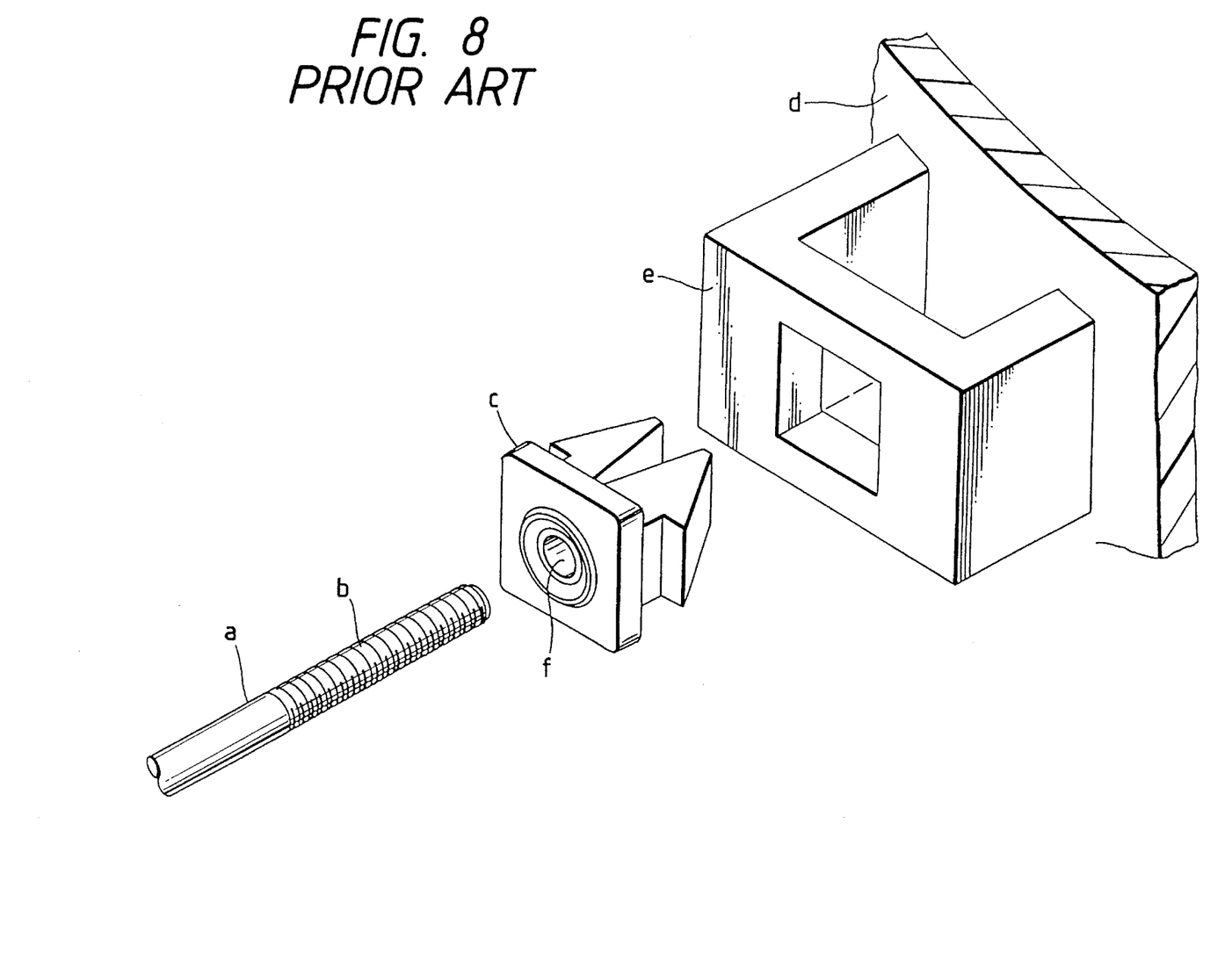
FIG. 8 is an exploded perspective view illustrating the principal parts of a conventional headlamp for a motor vehicle on an enlarged scale.

FIG. 8 illustrates the principal parts of an example of such a conventional headlamp for a motor vehicle. An adjusting shaft a is supported in a lamp housing (not shown in FIG. 8) in such a manner that the adjusting shaft may rotate freely. The adjusting shaft has a threaded shaft portion b at one end thereof. A nut c formed of synthetic resin is supported on a support part e of a reflector d performing as a tiltable member.

At the time of assembly, the adjusting shaft a must be rotated with its threaded shaft portion b being inserted into a lower hole f of the nut c, so that threaded shaft portion of the adjusting shaft is screwed with a self-tapping action into a lower hole f.

The conventional headlamp for a motor vehicle which has been described above suffers from a problem in that it takes a long time to assemble the headlamp because it is necessary to rotate the adjusting shaft a for connecting the adjusting shaft a and the nut c at the time of assembly.

SUMMARY OF THE INVENTION

The present invention was made in view of the disadvantages accompanying the conventional headlamp, and an object of the invention is to provide a vehicular headlamp capable of improving the assembly of an adjusting shaft with a nut.

The above and other objects can be achieved by the provision of a vehicular headlamp which, according to the present invention, includes an adjusting shaft and a nut formed of synthetic resin having elasticity and which has a threaded hole and a notch communicating with the threaded hole and extending the entire length of the threaded hole in the axial direction thereof and also opening into the side face thereof. The threaded shaft portion of the adjusting shaft is set into engagement with the threaded hole in the nut through the notch in the nut, and the nut is thereby supported on the tiltable member.

Accordingly, the vehicular headlamp according to the present invention allows assembly in a shorter time because the adjusting shaft can be connected to the nut merely by fitting the threaded shaft portion of the adjusting shaft into the threaded hole in the nut through the notch formed in the nut.

DESCRIPTION OF THE PREFERRED EMBODIMENTS

FIG. 1, together with FIGS. 2 through 7, illustrates a vehicular headlamp of a preferred embodiment of the present invention, FIG. 1 being an exploded perspective view;

DESCRIPTION OF THE PREFERRED EMBODIMENTS

A preferred embodiment of the present invention will now be described in detail with reference to the accompanying drawings. The preferred embodiment illustrated in the accompanying drawings is an example of the application of the present invention to an automobile headlamp generally known as a movable-reflector type headlamp.

Figure 1:
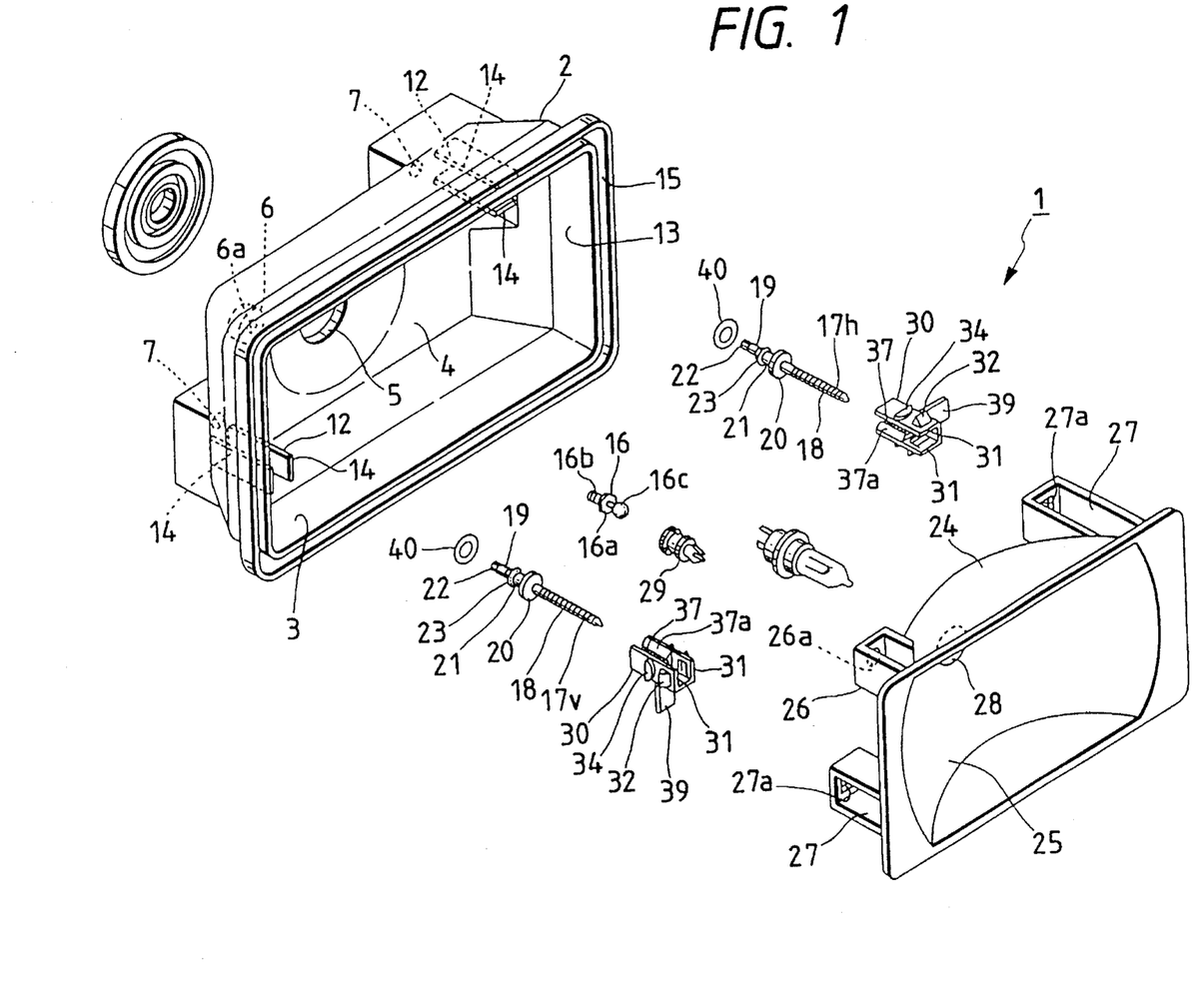
Figure 2:
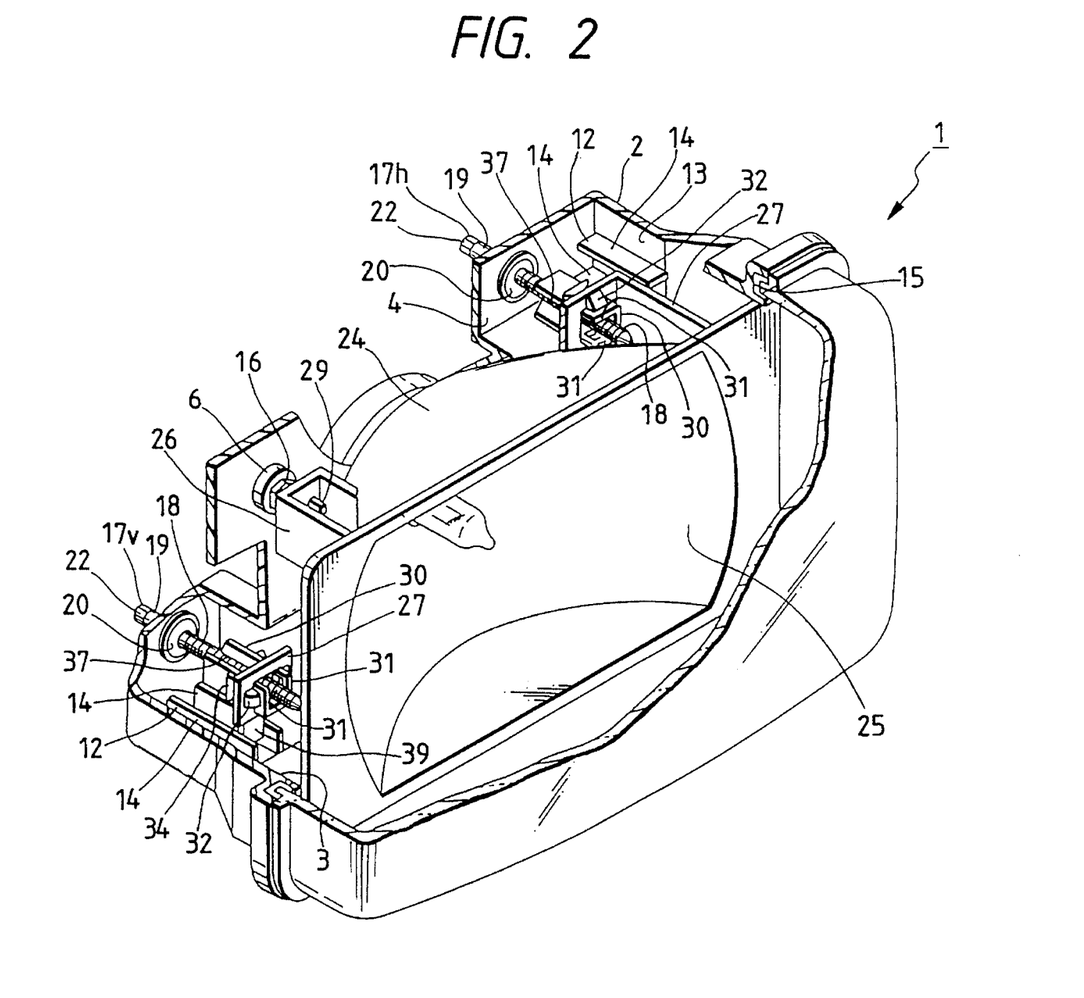
FIG. 2 is a partially cut-away perspective view of the headlamp of FIG. 1.
Figure 3:
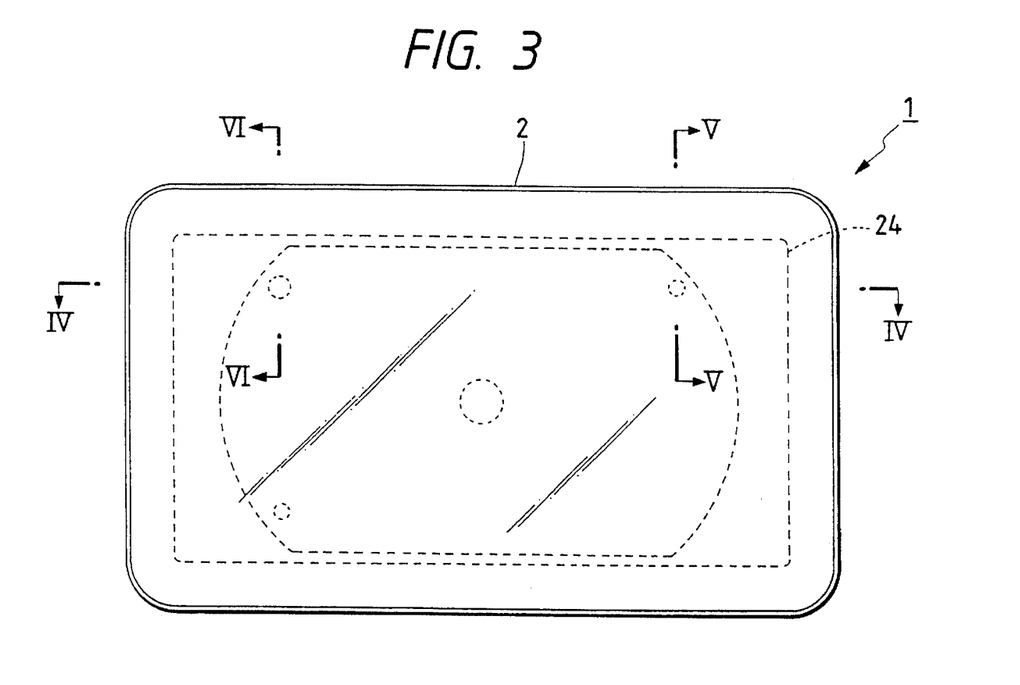
FIG. 3 is a front view of the headlamp of FIG. 1.
Figure 4:
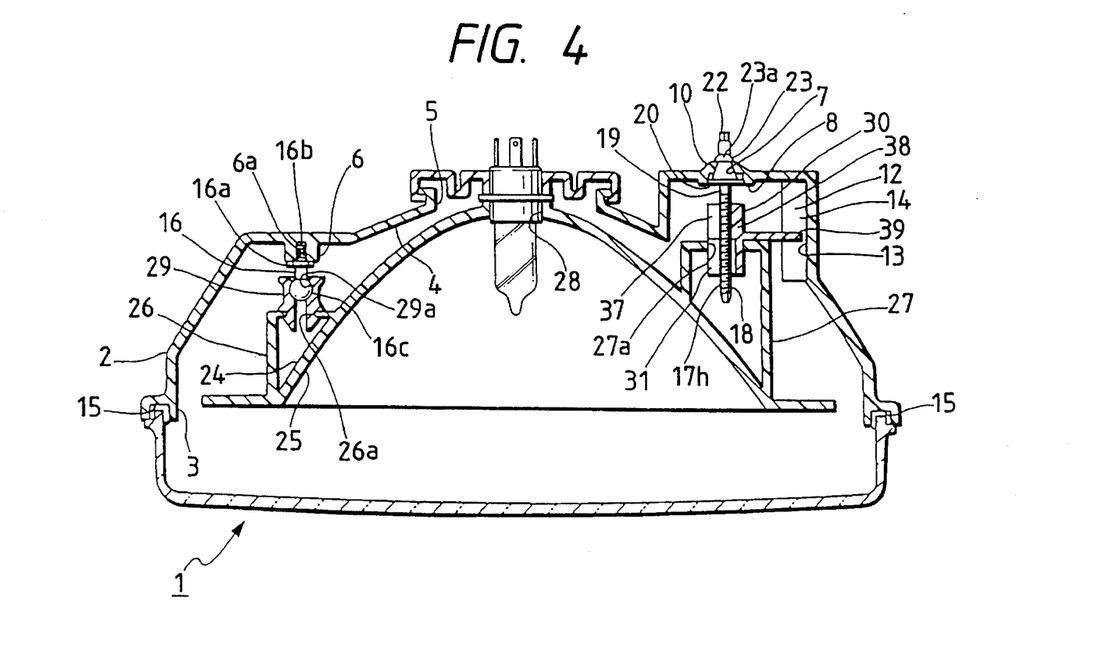
FIG. 4 is an enlarged sectional view showing the headlamp construction as taken along the line IV—IV indicated in FIG. 3.
Figure 5:
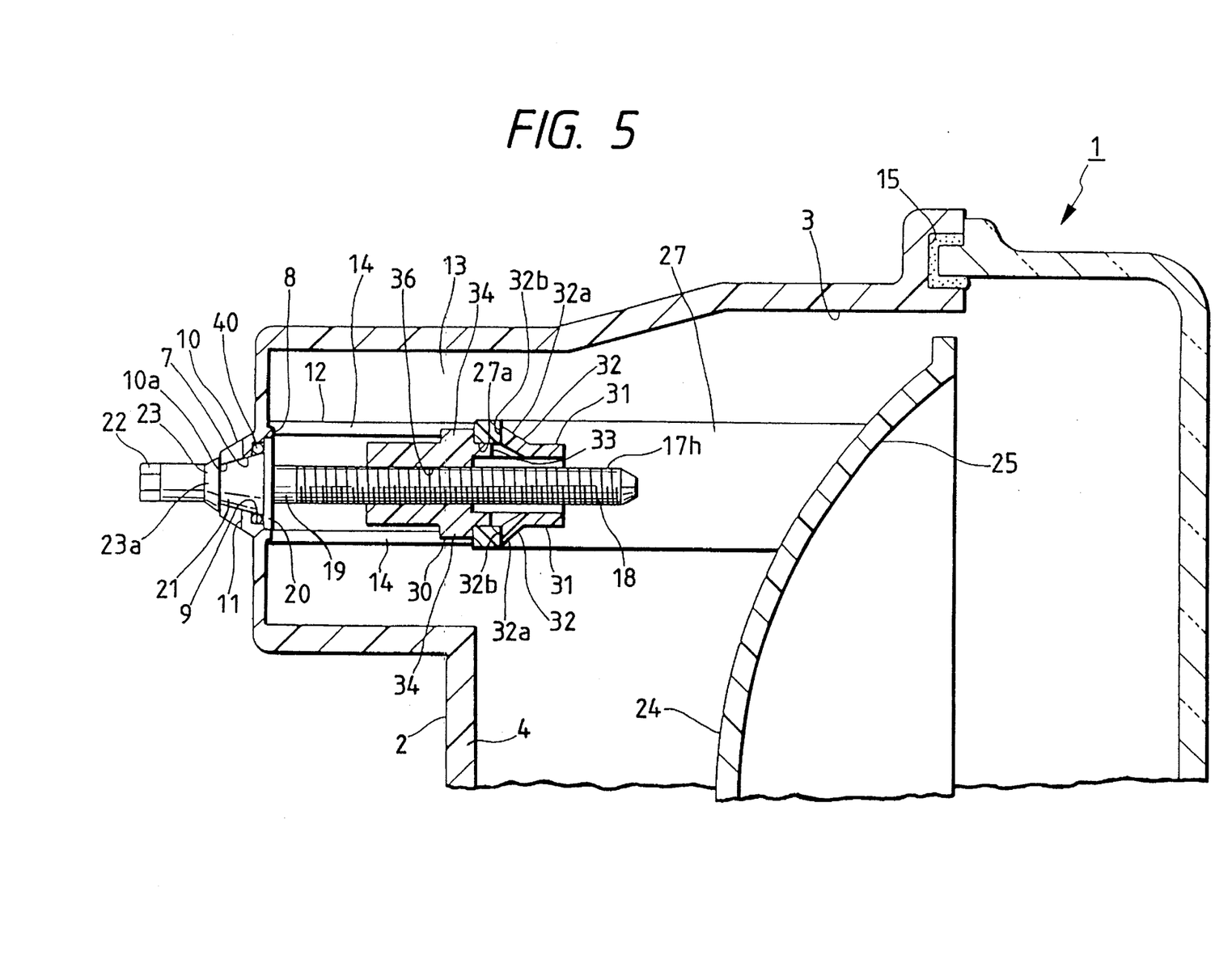
FIG. 5 is an enlarged sectional view showing the headlamp construction as taken along the line V—V indicated in FIG. 3.
Figure 6:
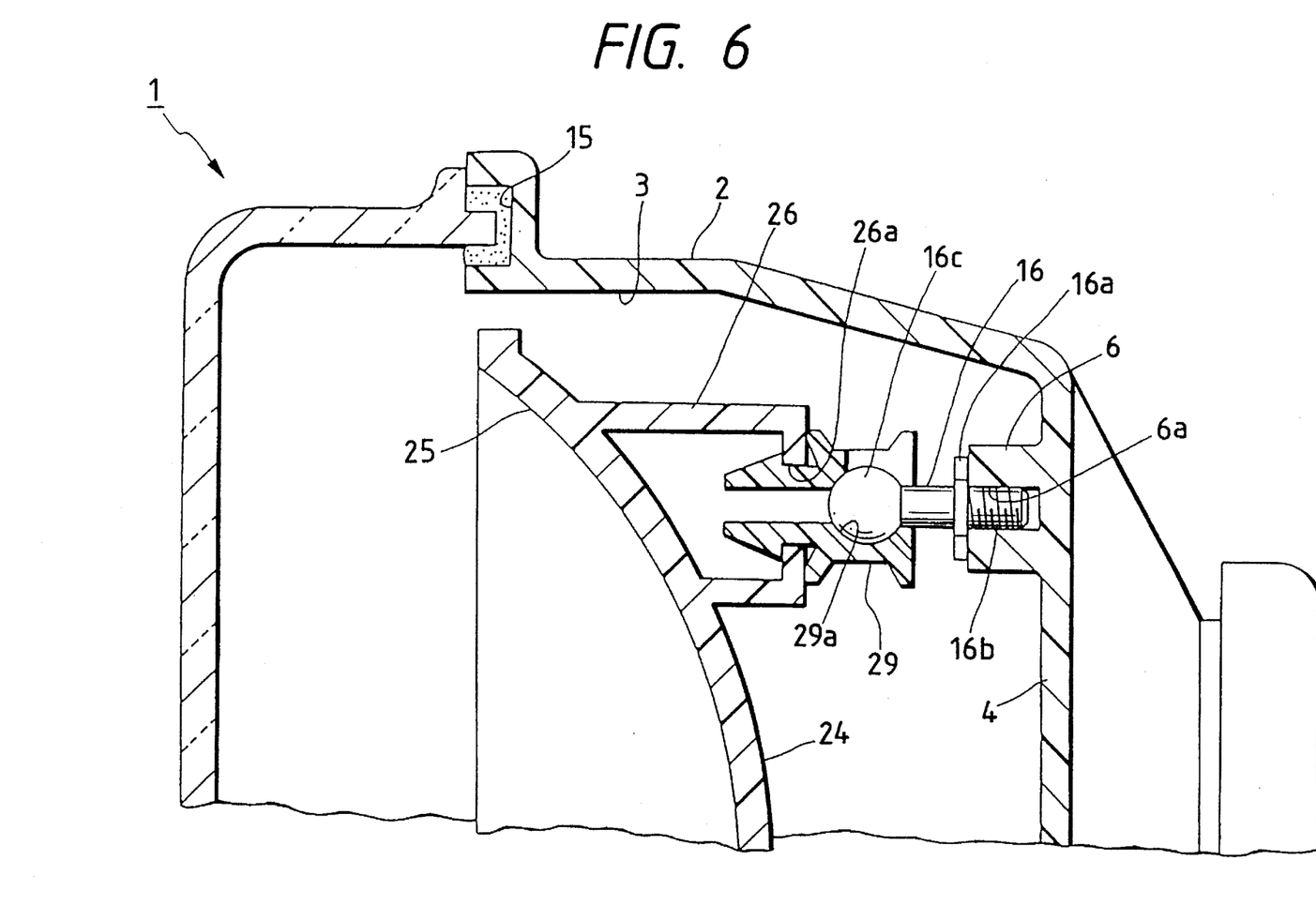
FIG. 6 is a sectional view showing the headlamp construction as taken along the line VI—VI indicated in FIG. 3.
Figure 7:
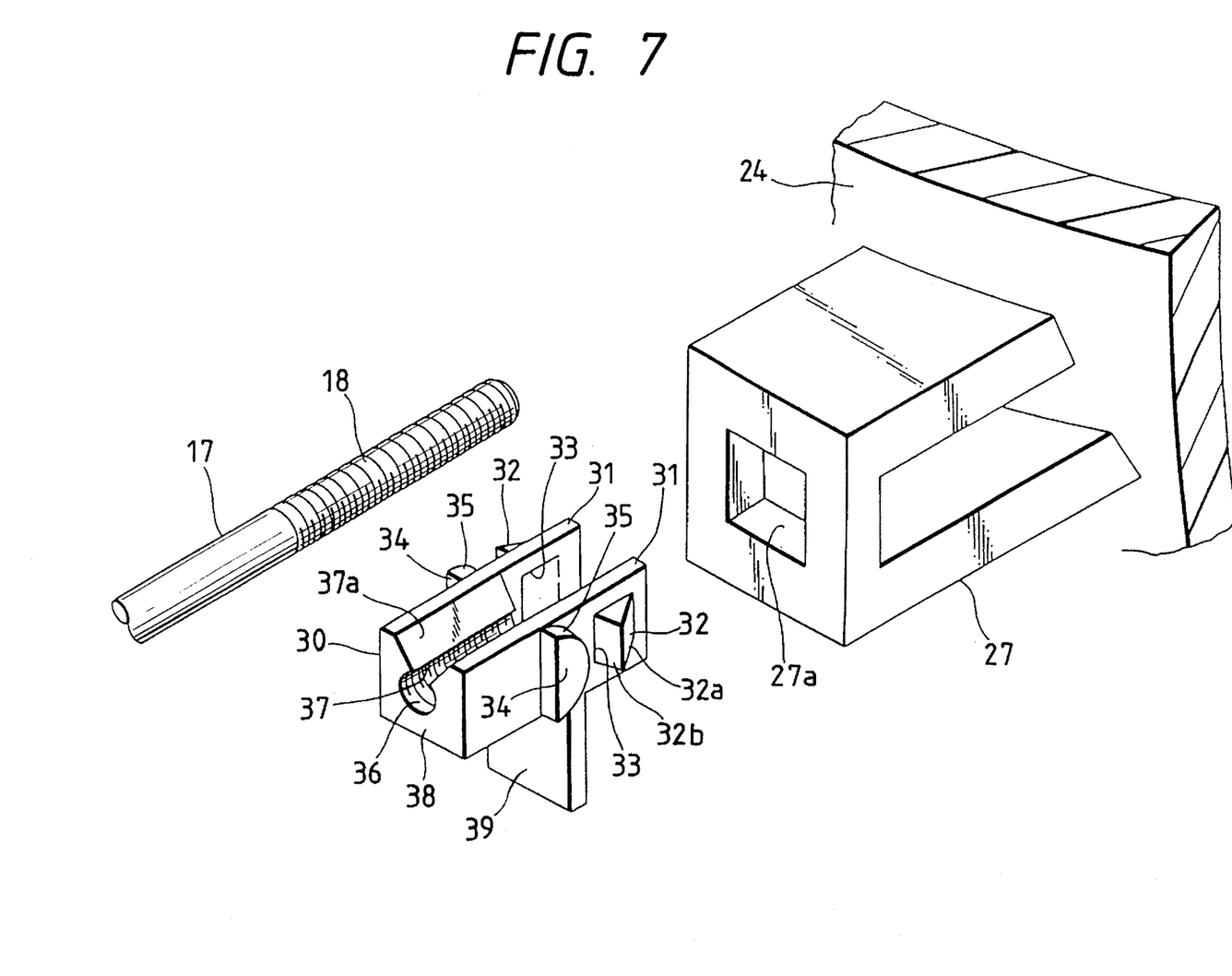
FIG. 7 is an exploded perspective view illustrating the adjusting screw and the nut as magnified.

Specifically, FIG. 1 is an exploded perspective view illustrating a vehicular headlamp of a preferred embodiment of the present invention, FIG. 2 is a partially cut-away perspective view, FIG. 3 is a front view of the vehicular headlamp according to the present invention, FIG. 4 is an enlarged sectional view showing the headlamp construction as taken along the line IV—IV indicated in FIG. 3, FIG. 5 is an enlarged sectional view showing the headlamp construction as taken along the line V—V indicated in FIG. 3, FIG. 6 is a sectional view showing the headlamp construction as taken along the line VI—VI indicated in FIG. 3, and FIG. 7 is an exploded perspective view illustrating the adjusting screw and the nut as magnified.

The automobile headlamp 1 of the present embodiment is provided with a lamp housing 2 made of synthetic resin and having a concave part 3, which has an opening in its front. An inserting hole 5 is formed at the center of a rear wall 4 of the lamp housing 2. In a movable-reflector type headlamp for an automobile such as that of the present embodiment, the lamp housing 2 acts as a fixed member, which is mounted on the body of the motor vehicle.

A boss seat 6 is formed in a protruding shape on the inner surface of an corner area in the rear wall 4 of the lamp housing 2, and a lower hole 6a, which has an opening in the front, is formed on the boss seat 6. Supporting holes 7 are formed in a corner area spaced downward from the boss seat 6 and in a corner area displaced sideward from the boss seat 6, each appearing in a circular shape when viewed from the front. Annular protrusions 8 are formed slightly apart from the supporting holes 7 in such a manner that each of the annular protrusions 8 encloses a supporting hole 7. Notches 9 extending in an annular shape are formed on the front opening edges of the supporting holes 7.

As best shown in FIG. 5, engaging support parts 10 are formed protruding rearward from the rear opening edges of the supporting holes 7, which engaging support parts are formed in a conical shape tapering toward the rear area with the narrower end cut off. The inner faces 10a and 10a of the engaging support parts 10 are formed as tapered faces. Each of the engaging support parts 10 has a slit 11 extending in the axial direction, and elasticity working in the direction at right angles with the axial direction is thereby provided in the engaging support parts 10.

Guide parts 12 illustrated in FIGS. 4 and 5 are formed in areas adjacent the supporting holes 7 in the side walls 13 of the lamp housing 2, these guide parts being formed on the guide walls 14, which extend in parallel in the forward and backward directions. An installing groove 15 is formed in the rim of the opening of the lamp housing 2, the installing groove 15 opening toward the front. The lamp housing 2 formed in this manner is fixed to the vehicle body.

As best shown in FIG. 6, a pivot shaft 16, individual parts of which are formed of metal in an integrated structure, has a rod shape as a whole. The portion to the rear of a flange 16*a* formed in the middle part thereof is formed as a threaded shaft portion 16*b*, and a spherical part 16*c* is formed at the front end. The pivot shaft 16, which is formed in the manner described above, is screwed up to the flange 16*a* in a lower hole 6*a* in the boss seat 6 formed in the lamp housing 2, and the pivot shaft 16 is thereby installed to protrude forward from one corner area of the rear wall 4 of the lamp housing 2.

As best shown in FIGS. 1 and 5, adjusting screws 17*h* and 17*v*, i.e., adjusting shafts, are rotatably supported on the lamp housing 2. The two adjusting screws 17*h* and 17*v* have the same structure and are supported in the same manner on the lamp housing, so that only one of these adjusting screws will be described in detail.

A forward portion of the adjusting screw 17*h* is formed as a threaded shaft portion 18, which performs as a connecting part with a reflector, which will be described later, while the rear portion of the threaded shaft portion 18 is a shaft portion 19. A flange 20 is formed in a protruding shape in a position which, being located on the shaft portion 19, is slightly behind the threaded shaft portion 18.

A tapered portion 21, which has a diameter decreasing toward the rear portion thereof, is formed at a point located immediately behind the flange 20. The top part of the tapered portion 21 has an outer diameter larger than the outer diameter of the shaft portion 19, while the rear end of the tapered portion has an outer diameter approximately equal to the outer diameter of the shaft portion 19. A head 22 formed in a hexagonal bolt shape is provided on the rear end portion. The outer diameter of the head 22 is either equal to or slightly smaller than the outer diameter of the shaft portion 19.

An engaging ridge 23 is formed in continuation at the rear end of the tapered portion 21. A reflector 24 formed of synthetic resin acts as a tiltable member in the movable-reflector type headlamp of the present embodiment. The reflector 24 has a concave part 25, which has an opening in the front, and the inner surface of the concave part 25 is formed into a reflecting surface.

A mounting part 26 protruding toward the rear area is formed in one corner area on the rear face of the reflector 24. The mounting part 26 is formed in an approximately square sleeve shape with an opening in one side face. A circular-shaped mounting hole 26*a* is formed in the rear wall of the mounting part 26. A prop member 29 made of synthetic resin is supported in the mounting hole 26*a* of the mounting part 26 for the reflector 24, and a concave part 29*a* is formed in a spherical shape with an opening formed in its rear end.

As best shown in FIG. 7, mounting parts 27, which protrude in the rear direction, are formed in two locations, namely, in a position apart downward from the mounting part 26 and in another position apart sideways from the mounting part 26. Rectangular mounting holes 27*a* are formed in the rear wall of the mounting parts 27. A bulb holding hole 28 is formed in the central area of the reflector 24.

A nut 30 made of synthetic resin is separately supported in the mounting holes 27*a* of the mounting part 27 of the reflector 24. The nut 30, which is formed of synthetic resin having a proper degree of elasticity, for example, nylon resin or Delrin, is formed in a square sleeve shape with one side face opened.

As illustrated in FIGS. 5 and 7, engaging protrusions 32 formed in a thick wedge shape at the rear end as viewed in a direction perpendicular to the axial direction protrude along the outer surface of the front end portion of the two mutually opposed side walls 31. Then engaging protrusions 32 have respective slits 33 formed along the three edges thereof, excluding their front end edge, whereby the engaging protrusions 32 are given deflecting elasticity enabling the rear ends of the engaging protrusions 32 to move in a direction approximately perpendicular to the side walls 31.

Receiving protrusions 34 protrude from positions slightly behind the engaging protrusions 32 in the outer surface of the side walls 31. The front faces of the receiving protrusions are located in the most forward positions in the central area opposed to the rear end of the engaging protrusions 32, and are formed into arc-shaped faces which are displaced rearward from the central area to the end part. The distance from the central area in each of the front faces 35 to each of the rear ends of the engaging protrusions 32 is approximately equal to the plate thickness in the portion where the mounting holes 27*a* of the mounting parts 27 of the reflector 24 are formed.

A threaded hole 36 is formed on the inner surface of the rear half portion of the nut 30. The threaded hole 36 opens to the side face which is kept open by the notch 37. The mutually opposed surfaces 37*a* of the notch 37 are tilted surfaces, with the distance between the surfaces 37*a* being smaller than the outer diameter of the threaded shaft portion of the adjusting screw 17, as measured at the side of the threaded hole 36, and larger than the outer diameter of the threaded shaft portion 18 at the side opposite the threaded hole 36.

A guided protrusion 39 protrudes to the side opposite to the opening of the nut 30 from the outer surface of the side wall 38 at the side opposite to the opening of the nut 30. The width of the guided protrusion 39 as seen from the forward and backward direction is approximately equal to the distance between the guide walls 14 of the guide part 12.

The adjusting screw 17 described above is joined with the nut 30 in the manner described below.

Specifically, the threaded shaft portion 18 of the adjusting screw 17 is placed on the opposed surfaces 37*a* of the notch 37 in the nut 30. Then, the threaded shaft portion 18 of the adjusting screw 17 is pushed into the inner part of the notch 37. The threaded shaft portion 18 pushes the opposed faces 37*a* in opposite directions from each other, whereby the side walls 31 of the nut 30 are thereby deflected outward, so that the clearance between the opposed faces 37*a* is enlarged. Thus, the threaded shaft portion 18 of the adjusting screw 17 passes through the notch 37 and is set into engagement with the threaded hole 36.

The nut 30 which has been connected with the adjusting screw 17 is then mounted on the reflector 24 in the manner described below.

In specific terms, the nut 30 is inserted into the mounting hole 27a for the reflector 24 from a point behind the rear of the mounting hole 27a. Then, the tilted surfaces 32a of the engaging protrusions 32 of the nut 30 are pressed down by the edge of the mounting hole 27a, so that the rear ends of the engaging protrusions 32 are deflected so as to be brought closer together. The front faces 35 of the receiving protrusions 34 move forward until they are brought into direct contact with the rear rim of the mounting hole 27a. When the rear ends of the engaging protrusions 32 have passed through the mounting hole 27a, the tilted surfaces 32a of the engaging protrusions are no longer pressed down by the rim of the mounting hole 27a, so that the engaging protrusions 32 are restored to their original states, the rear end faces 32b being thereby set in opposition to the front rim of the mounting hole 27a. Therefore, the nut 30 is held in the mounting part 27 for the reflector 24 while the nut 30 is in a state where it holds the rim of the mounting hole 27a by the rear end faces 32b of its engaging protrusions 32 and the front faces 35 of the receiving protrusions 34.

In this regard, even in a case where the slits 33 which have been formed on the peripheral rim of the engaging protrusions 32 of the nut 30 are not provided, the engaging protrusions 32 can pass through the mounting holes 27a for the reflector 24 because the side walls 31 on which the engaging protrusions 32 are formed have side edges thereof located at the side of the opening, so that the side edges can deflect to be brought closer together.

The adjusting screw 17 is rotatably supported in the lamp housing 2 in the manner described below.

The adjusting screw 17 is inserted from the front side in the order of its head 22, its shaft portion 19, and its engaging ridge 23, its tapered portion 21 in the supporting hole 7 and the engaging support part 10, which are formed in the lamp housing 2. The tapered surface 10a of the engaging support part 10 comes into contact precisely with the outer circumferential surface of the tapered portion 21. That is, the length of the engaging support portion 10 is approximately equal to the length of the tapered portion 21. The tilting angle of the tapered surface 10a is made equal to the tilting angle of the outer circumferential surface of the tapered portion 21 so that the portion of the adjusting screw 17 adjacent to the engaging ridge 23 can be inserted smoothly through the engaging support part 10 because the engaging ridge 23 passes through the engaging support part 10 by pushing it to expand it slightly, engaging with the rear end part of the engaging support part 10. At such time, the flange 20 is brought into direct contact with the front area of the rear wall 4 of the lamp housing 2, and the flange 20 fits almost exactly with the inner side of the annular protruding bar 8 while the outer circumferential surface of the tapered portion 21 fits almost exactly with the tapered surface 10a of the engaging support part 10. In this regard, reference number 40 denotes an O-ring, which is externally fit on the front end portion of the tapered portion 21 of the adjusting screw 17.

The reflector 24 is tiltably supported in the lamp housing 2 in the manner described below.

Two adjusting screws 17h and 17v, with the pivot shafts 16 and nuts 30 respectively connected thereto, are supported in the lamp housing 2. The guided protrusions 39 of the nuts 30 are positioned between the individual guide walls 14, slidable therewith.

Then, the reflector 24 is pushed toward the inner recess of the concave part 3 in a state where the opening rim of the bulb-shaped concave portion 29a of the prop member 29 supported by the mounting part 26 of the reflector 24 is held on the bulb-shaped part 16c of the pivot shaft 16 and where the forward end parts of the nuts 30 are inserted through the mounting holes 27a. The bulb-shaped part 16c of the pivot shaft 16 is thereby rotatably fitted into the inside area of the bulb-shaped concave area 29a of the prop member 29, which is supported on the reflector 24, and the nuts 30 are supported in the mounting holes 27a in the manner described above. With this procedure, the reflector 24 is tiltably supported within the lamp housing 2.

That is, rotation of the adjusting screw 17h causes the reflector 24 to pivot around an axis formed by a line connecting the point where the bulb-shaped portion 16c of the pivot shaft 16 connects with the prop member 29 with the point where the adjusting screw 17v connects with the nut 30. Similarly, when the adjusting screw 17v is rotated, the reflector 24 is caused to pivot around an axis formed by a line connecting the point where the bulb-shaped portion 16c of the pivot shaft 16 connects with the prop element 29 with the point where the adjusting screw 17h connects with the nut 30.

The nut 30 is moved in the forward and rearward direction by rotation of the adjusting screw 17 at the time of an adjustment operation. The movement of the nut 30 is smooth and along by a predetermined route as determined by the guided protruding portion 39 as guided by the guide part 12.

Conventionally, a shearing load was placed on the adjusting screws when the reflector moves, but with the invention such movement of the reflector as would cause a shearing load to be generated is prevented because the guided protrusions 39 of the nuts 30 are almost fully inhibited from moving except in the forward and rearward direction by the guide walls 14 of the guide parts 12. Thus, scarcely any shearing load is placed on the adjusting screws 17. Therefore, even in a case where the adjusting screws 17 are formed of synthetic resin, such adjusting screws will be fully satisfactory in use.

As it is evident from the description above, the vehicular headlamp according to the present invention is provided with an adjusting shaft which tiltably supports a tiltable member on a fixed member mounted on the vehicle body, thereby varying the light beam axis, the adjusting shaft is supported on the fixed member with the rotatable support, and also is helically joined with the tiltable member. The headlamp is characterized by providing an adjusting shaft and a nut formed of synthetic resin and having a threaded hole and a notch communicating with the threaded hole and extending over the entire length of the threaded hole in the axial direction of the nut and opening in a side surface thereof, and in that the threaded shaft portion of the adjusting shaft engages the threaded hole of the nut through the notch, thereby holding the nut supported with the tiltable member.

Therefore, the vehicular headlamp according to the present invention allows assembly in a shorter time since the adjusting shaft and the nut can be connected simply by fitting the threaded shaft portion of the adjusting shaft into the threaded hole through the notch in the nut.

Moreover, the present invention offers an additional advantage that the adjusting shaft is placed under almost no load, and particularly under almost no shearing load, due to the fact that a guide part extending approximately in the forward and rearward direction is formed on the fixed member and is used to guide the nut.

The above preferred embodiment of the present invention is applied to a movable-reflector type headlamp for a motor vehicle, but it goes without saying that the present invention can be applied also to other types of lighting apparatuses for a motor vehicle, for example, a movable-unit type headlamp for a motor vehicle. In case the present invention is applied to such a movable-unit type headlamp, the headlamp unit will then be the tiltable member, while the vehicle body or a member supported on the vehicle body will be the fixed member.

Still further, any and all of the specific shapes and configurations of the individual parts shown or described in the example of the preferred embodiment discussed above are no more than mere examples for implementation in the practice of the present invention, and it should be noted that the technical scope of the present invention must not be limited in any way on the basis of or with reference to these shapes and these configurations of the various parts described in the example above.

What is claimed is:

1. A vehicular headlamp comprising:

a stationary member:

a tiltable member pivotally moving laterally and vertically with respect to said stationary member about a pivot point, said tiltable member having a mount member;

means for pivotally connecting said stationary member to said tiltable member, said connecting means performing as said pivot point;

means for pivotally moving said tiltable member, said moving member comprising:

an adjusting shaft having a shaft part and a threaded part, said shaft part being rotatably supported by said stationary member; and a resilient nut means fixedly engaging with said mount member of said tiltable member, said nut means having a threaded hole extending in a longitudinal direction with a notch through which said adjusting shaft is laterally inserted into said nut in a direction transverse to said longitudinal direction, said threaded part of said adjusting shaft engaging said threaded hole of said nut means, said nut means moving back and forth in said longitudinal direction by rotating said adjusting shaft.

2. The vehicular headlamp according to claim 1, wherein said nut means is formed of synthetic resin.

3. The vehicular headlamp according to claim 2, wherein said nut means is formed of nylon resin 4. The vehicular headlamp according to claim 2, wherein said nut means is formed of Delrin.

5. The vehicular headlamp according to claim 1, wherein said adjusting shaft is formed of synthetic resin.

6. The vehicular headlamp according to claim 1, wherein said stationary member is a lamp housing secured to a vehicle body and said tiltable member is a-reflector of the headlamp.

7. The vehicular headlamp according to claim 1, wherein said stationary member is a vehicle body and said tiltable member is a lamp unit of the headlamp.

8. A vehicular headlamp comprising:

a stationary member:

a tiltable member pivotally moving laterally and vertically with respect to said stationary member about a pivot point, said tiltable member having a mount member;

means for pivotally connecting said stationary member to said tiltable member, said connecting means performing as said pivot point;

means for pivotally moving said tiltable member, said moving member comprising:

an adjusting shaft having a shaft part and a threaded part, said shaft part being rotatably supported by said stationary member; and a substantially square-shaped resilient nut means fixedly engaging with said mount member of said tiltable member, said nut means comprising a threaded hole with a notch through which said adjusting shaft is inserted into said nut, said threaded part of said adjusting shaft engaging said threaded hole of said nut means, said nut means moving back and forth by rotating said adjusting shaft; wherein said notch of said nut means comprises inclined surfaces each having an outer edge and an inner edge, a distance between said opposed inner edges of said inclined surfaces being smaller than an outer diameter of said threaded part of said adjusting shaft, and a distance between said opposed outer edges of said inclined surfaces being larger than the outer diameter of said threaded part of said adjusting shaft.

9. A vehicular headlamp comprising:

a stationary member:

a tiltable member pivotally moving laterally and vertically with respect to said stationary member about a pivot point, said tiltable member having a mount member;

means for pivotally connecting said stationary member to said tiltable member, said connecting means performing as said pivot point;

means for pivotally moving said tiltable member, said moving member comprising:.

an adjusting shaft having a shaft part and a threaded part, said shaft part being rotatably supported by said stationary member; and a substantially square-shaped resilient nut means fixedly engaging with said mount member of said tiltable member, said nut means comprising a threaded hole with a notch through which said adjusting shaft is inserted into said nut, said threaded part of said adjusting shaft engaging said threaded hole of said nut means, said nut means moving back and forth by rotating said adjusting shaft; wherein said mount member of said tiltable member has a mounting hole, and said nut means further comprises:

a side wall;

an engaging protrusion protruding from said side wall and formed in a thick wedge shape at a rear end as viewed in a direction perpendicular to an axial direction, said engaging protrusion engaging said mounting hole of said mount member; and a plurality of receiving protrusion protruding from a position slightly behind said engaging protrusion on said side walls, a front face of said receiving protrusion being located in a most forward positions in a central area opposed to a rear end of said engaging protrusion and formed in an arc-shaped face.

10. The vehicular headlamp according to claim 9, wherein a distance between the rear end of said engaging protrusion and the front face of said receiving protrusion is approximately equal to a depth of said mounting hole of said mount member of said tiltable member.

11. The vehicular headlamp according to claim 9, wherein said engaging protrusion comprises a slit formed along three edges thereof, excluding a front end edge.

12. The vehicular headlamp according to claim 9, wherein said nut means further comprises a guided protrusion extending to a side opposite to the opening of said nut means from an outer surface of said side wall at a side opposite thereto, a width of said guided protrusion being approximately equal to a distance between guide walls formed on said stationary member.

13. In a vehicular headlamp comprising an adjusting shaft which supports a tiltable member in such a manner that the tiltable member is caused to tilt in response to rotation of said adjusting shaft, said tiltable member having a mount member, thereby varying the irradiating axis of the headlamp by pivoting said tiltable member with respect to a member fixed with respect to a vehicle body, said adjusting shaft being rotatably supported on said fixed member, said adjusting shaft being threadedly joined to said tiltable member, the improvement wherein said adjusting shaft has a threaded shaft portion engaging with a threaded hole in a nut through a notch formed in said nut, said nut being fixedly attached to said mount member of said tiltable member, said nut being made of synthetic resin having elasticity, said threaded hole and said notch extending an entire length of said nut in an axial direction of said nut, and said notch opening into a side face of said nut.

14. The vehicular headlamp according to claim 13, further comprising a guide part formed on said fixed member and extending approximately in a forward and rearward direction, said guide part guiding said nut.

* * * * *